United States Patent
Galperin et al.

(10) Patent No.: US 7,499,868 B2
(45) Date of Patent: Mar. 3, 2009

(54) METHOD FOR OPTIMIZING NET PRESENT VALUE OF A CROSS-SELLING MARKETING CAMPAIGN

(75) Inventors: Yuri Galperin, Reston, VA (US); Vladimir Fishman, Farmington, CT (US); Leonid Gibiansky, N. Potomac, MD (US)

(73) Assignee: Marketswitch Corporation, Herndon, VA (US)

( * ) Notice: Subject to any disclaimer, the term of this patent is extended or adjusted under 35 U.S.C. 154(b) by 237 days.

(21) Appl. No.: 11/343,280

(22) Filed: Jan. 30, 2006
(Under 37 CFR 1.47)

(65) Prior Publication Data
US 2006/0218033 A1 Sep. 28, 2006

Related U.S. Application Data

(63) Continuation of application No. 09/634,624, filed on Aug. 5, 2000, now Pat. No. 6,993,493.

(60) Provisional application No. 60/147,456, filed on Aug. 6, 1999.

(51) Int. Cl.
*G06Q 10/00* (2006.01)
(52) U.S. Cl. .......................................... 705/7
(58) Field of Classification Search .................... 705/10

See application file for complete search history.

(56) References Cited

U.S. PATENT DOCUMENTS

| 6,044,357 A | 3/2000 | Garg |
| 6,334,110 B1 | 12/2001 | Walter et al. |
| 6,412,012 B1 | 6/2002 | Bieganski et al. |

FOREIGN PATENT DOCUMENTS

| WO | WO 99/22328 A1 | 5/1999 |
| WO | WO 00/55789 A2 | 9/2000 |
| WO | WO 00/55790 A2 | 9/2000 |
| WO | WO 01/11522 A2 | 2/2001 |

OTHER PUBLICATIONS

Gonul, Fusun; Shi, Meng Ze; "Optimal Mailing of Catalogs: A New Methodology Using Estimable Structural Dynamic Programming Models", (C) 1997, Institute for Operations Research, pp. 1249-1262.*

(Continued)

*Primary Examiner*—Jonathan G Sterrett
(74) *Attorney, Agent, or Firm*—Knobbe Martens Olson & Bear LLP

(57) ABSTRACT

The present invention applies a novel iterative algorithm to the problem of multidimensional optimization by supplying a strict, nonlinear mathematical solution to what has traditionally been treated as a linear multidimensional problem. The process consists of randomly selecting a statistically significant sample of a prospect list, calculating the value of the utility function for each pair of an offer and selected prospects, reducing the original linear multidimensional problem to a non-linear problem with a feasible number of dimensions, solving the non-linear problem for the selected sample numerically with the desired tolerance using an iterative algorithm, and using the results to calculate an optimal set of offers in one pass for the full prospect list.

17 Claims, 4 Drawing Sheets

OTHER PUBLICATIONS

GR Bitran, SV Mondschein—Management Science, 1996—JSTOR Mailing Decisions in the Catalog Sales Industry. Gabriel R. Bitran. Susana V. Mondschein. Management Science, vol. 42, No. 9, 1364-1381. Sep. 1996.*

Hakan Polatoglua, and Izzet Sahinb; Probability distributions of cost, revenue and profit over a warranty cycle European Journal of Operational Research vol. 108, Issue 1, Jul. 1, 1998, pp. 170-183.*

Optimal Selection for Direct Mail Jan Roelf Bult; Tom Wansbeek Marketing Science, vol. 14, No. 4. (1995), pp. 378-394.*

Customer Base Analysis: An Industrial Purchase Process Application David C. Schmittlein; Robert A. Peterson Marketing Science, vol. 13, No. 1. (Winter, 1994), pp. 41-67.*

Direct mail selection by joint modeling of probability and quantity of response P Otter, H Scheer, T Wansbeek—1997.*

A Decision Theoretic Framework for Profit Maximization in Direct Marketing L Muus, H Van der Scheer, TJ Wansbeek, R te . . . —1996—dspace.ub.rug.nl (retrieved from the web at: http://som.eldoc.ub.rug.nl/FILES/reports/1995-1999/themeB/1996/96B28/96b28.pdf).*

Direct marketing modeling with CART and CHAID Dominique Haughton 1, Samer Oulabi 2 Journal of Direct Marketing, Copyright © 1997 John Wiley & Sons, Inc vol. 11, Issue 4 , pp. 42-52.*

Jost, Allen; "Neural Networks"; Credit World, vol. 81, No. 4, pp. 26-33, Mar./Apr. 1993.

Egol, Len; "What's New in Database Marketing Software"; Direct, vol. 6, No. 8, p. 39(4), Aug. 1994.

Sweat, Jeff; "Know Your Customers"; Information Week, p. 20, Nov. 30, 1998.

* cited by examiner

METHOD FOR OPTIMIZING NET PRESENT VALUE OF A CROSS-SELLING MARKETING CAMPAIGN

RELATIONSHIP TO OTHER APPLICATIONS

This application is a continuation of U.S. application Ser. No. 09/634,624 filed Aug. 5, 2000, now U.S. Pat. No. 6,993,493 which claims the benefit of priority of U.S. Provisional Application Ser. No. 60/147,456 filed Aug. 6, 1999. The disclosures of the foregoing applications are incorporated by reference.

FIELD OF THE INVENTION

This invention relates generally to the development of a method to optimize the effects of cross-selling marketing campaigns. More specifically, this invention is an improvement on the application of classical methods of discrete linear programming to the problem of multidimensional optimization.

BACKGROUND OF THE INVENTION

Businesses typically have a number of promotions to offer to a large list of prospective customers. Each promotion may have an eligibility condition, a response-model, and a profitability model associated with it.

Some promotions may be combined into Peer Groups (i.e., groups of mutually exclusive offers, such as a credit card with different interest rates). A constraint may be placed on the maximum number of offers that goes to any customer; in addition, there may be business requirements such as minimal number of sales, minimal NPV (Net Present Value) per customer, maximal budget, etc. These requirements may apply to any individual promotion, a peer group, or a campaign as a whole.

The goal of cross-selling marketing optimization is to determine what offers to send to which customers to maximize a utility function of the campaign (total NPV, total number of sales etc.), while satisfying all the business requirements and constraints.

The present state of the art lets marketers process one offer at a time. A response and/or profitability model is applied and customers are rank-ordered based on propensity to respond to the offer. After this ordering, a certain percentage from the top of the list is selected to receive the offer. The same process is applied to all available offers separately.

As a result, the best, most responsive and valuable customers are saturated with offers and the middle segment of the customer list is ignored. The overall efficiency of the campaign therefore degrades.

Another significant drawback of this approach is the inability to satisfy various real-life constraints and business goals.

Most sophisticated marketers have tried to consolidate models built for different offers. However, these attempts have not been based on any solid scientific method, but rather have utilized an ad hoc approach. Because of this, only the most-simple constraints have been able to be satisfied and the solutions have been sub-optimal with respect to a utility function. In fact, these marketers haven't even been able to estimate how far off they are from the true optimum.

What would therefore be useful is a process that provides a mathematically optimal offer allocation, i.e., one that selects an optimal set of offers for each customer that maximizes the utility function and satisfies all business goals and constraints.

SUMMARY OF THE INVENTION

The present invention represents the application of a novel iterative algorithm to the problem of multidimensional optimization. The present invention supplies a strict, nonlinear mathematical solution to what has traditionally been treated as a linear multidimensional problem.

The problem in its original form is a problem of discrete linear programming. However, due to a huge number of dimensions (in a typical business case $N=O(10^8)$, $M=O(10^2)$), the application of classical methods of discrete linear programming is not feasible.

The process of the present invention consists of randomly selecting a statistically significant sample of a prospect list, calculating the value of the utility function for each pair of an offer and selected prospects, reducing the original linear multidimensional problem to a non-linear problem with a feasible number of dimensions, solving the non-linear problem for the selected sample numerically with the desired tolerance using an iterative algorithm, and using the results to calculate an optimal set of offers in one pass for the full prospect list.

It is an object of the present invention to increase the efficiency of a cross-selling marketing campaign.

It is an object of the present invention to increase the efficiency of cross-selling campaigns that include a large number of offers.

It is an object of the present invention to provide optimization of cross-selling campaigns wherein groups of offers can be mutually exclusive.

It is an object of the present invention to increase the efficiency of cross-selling campaigns that are targeted to large number of prospective customers.

It is an object of the present invention to increase the efficiency of cross-selling campaigns by selecting an individual, optimal set of offers for each customer.

It is an object of the present invention to constrain of maximum number of offers sent to a customer within cross-selling campaigns.

It is an object of the present invention to satisfy business goals, like minimum number of sales and budget constraints, while optimizing cross-selling campaigns as applied to individual offers, groups of offers or the entire campaign.

It is an object of the present invention to maximize a user-chosen utility function, like total NPV or number of sales, within a cross-selling campaign.

It is an object of the present invention to mathematically maximize the utility function and satisfy all constraints within a cross-selling campaign.

It is an object of the present invention to allow interactive changes in goals or constraints of cross-selling campaigns and quickly view the results.

It is an object of the present invention to provide final scoring for cross-selling campaigns in a single pass so as to scalable and efficient enough to process a list of 100 million customers overnight.

It is yet another object of the invention to provide true "one-to-one" marketing in cross-selling campaigns.

DETAILED DESCRIPTION OF THE INVENTION

The present invention represents the application of a novel iterative algorithm to the problem of multidimensional optimization of cross-selling campaigns by supplying a strict, nonlinear mathematical solution to the traditional linear multidimensional problem desired to be solved when offering a large number of promotions M to a very large set of prospective customers N.

Figure 1:
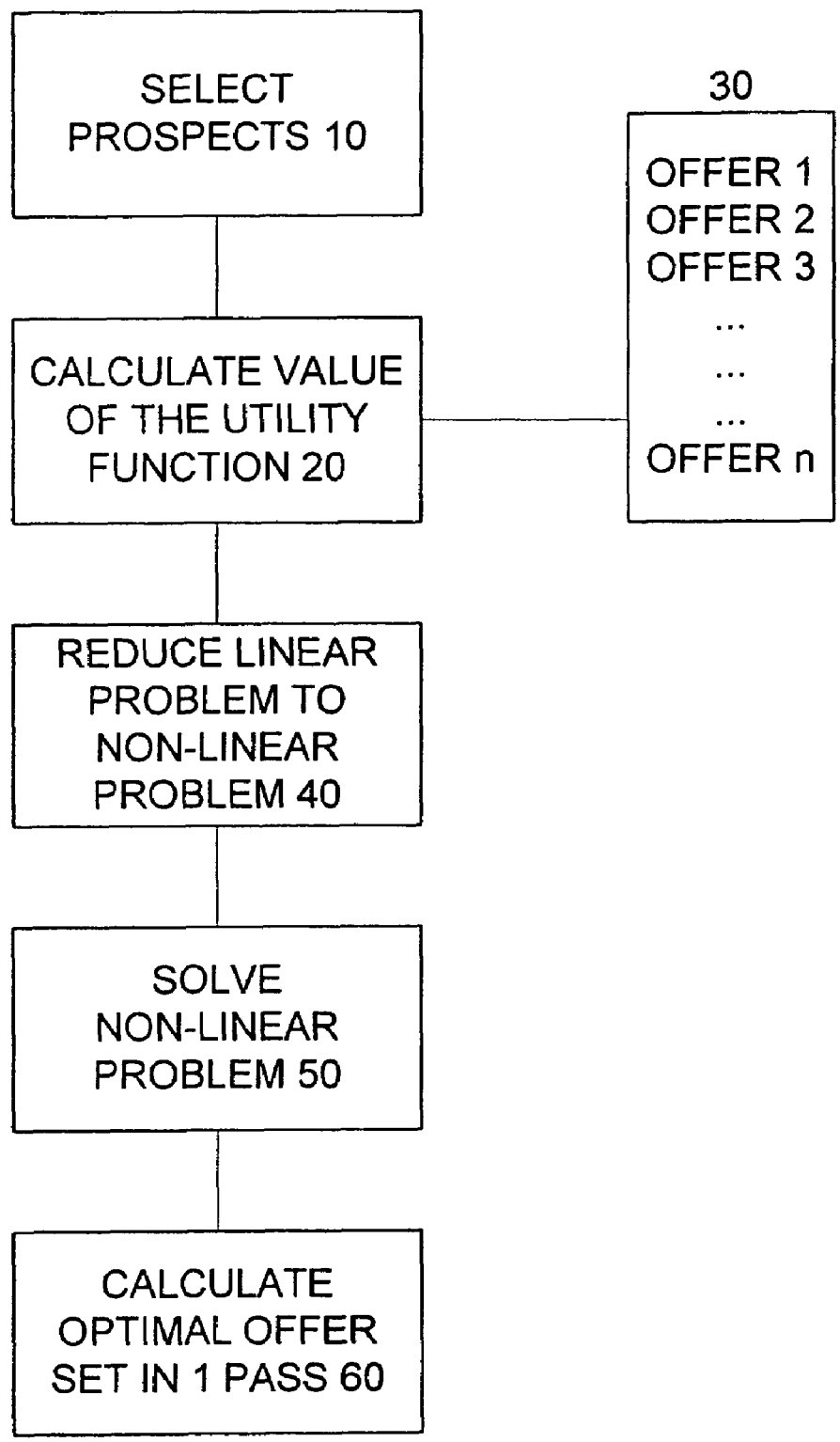
FIG. 1 is a flow chart of the basic process of the present invention.

The process of the present invention, as shown in FIG. 1, consists of randomly selecting a statistically significant sample 10 of a prospect list, calculating the value of the utility function 20 for each pair of an offer 30 and selected prospects 10, reducing the original linear multidimensional problem to a non-linear problem 40 with a feasible number of dimensions, solving the non-linear problem 50 for the selected sample numerically with the desired tolerance using an iterative algorithm, and using the results to calculate an optimal set of offers 60 in one pass for the full prospect list.

Let
$A=(a_{ij})$, be a solicitation matrix, where
 $a_{ij}=1$, if offer j goes to a customer i
 $=0$, otherwise;
$R=(r_{ij})$, be a response matrix, where
 $r_{ij}$—is a probability for a customer i respond to a promotion j;
$P=(p_{ij})$, be a profitability matrix, where
 $P_{ij}$—is a profitability of a customer i, if he/she responds to a promotion j.

Total NPV of the campaign, NPV=NPV( A, R, P), is a linear function of $a_{ij}$, $r_{ij}$, $p_{ij}$ and other economic parameters of the campaign.

Eligibility conditions, peer group logic, and maximal number of offers per customer constraint can be expressed by a set of inequalities $C_{ik}$ $$C_{ik}(A) <= 0, i=1,2,\ldots,N, k=1,2,\ldots,K$$

where $C_i$ are linear functions, and N is of the order of number of customers in the prospect list, K is number of restrictions. These customer-level restrictions are applied for each individual. Economic goals are expressed by a set of inequalities G for each promotion and the whole campaign:

$$G_{j,l}(A, R, P) <= 0, j=1,2,\ldots,M, l=1,2,\ldots,L_j$$

$$G_{0,l}(A, R, P) <= 0, l=1,2,\ldots,L_0$$

where $G_j$ are linear functions, and M is of the order of number of promotions in the campaign, $L_j$ is total number of restrictions. These main restrictions are applied for a promotion or the campaign, and G is a sum over all eligible customers.

It is desired to then find a solicitation matrix A that maximizes NPV(A,*) under the condition that all constraints C and G are satisfied.

Figure 2:
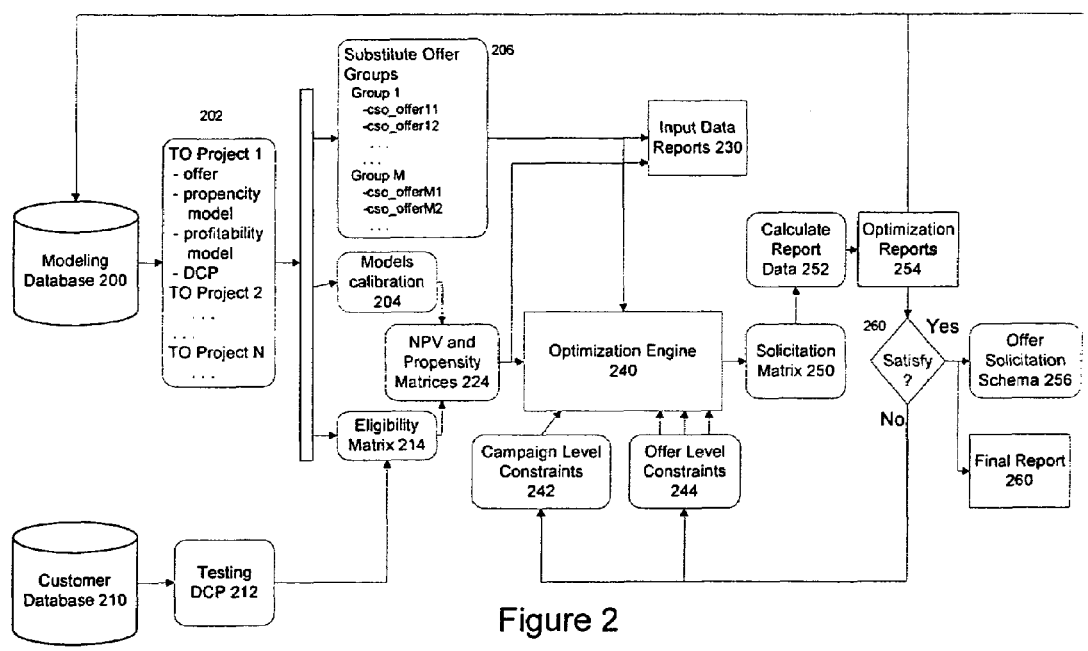
FIG. 2 is a more detailed data flow of a marketing optimization process of the present invention.

The solution presented by the inventors uses the following steps, as shown in FIG. 2. A first step is to create a campaign or project by selecting a set 202 of targeting optimizer (TO) projects from a modeling database 200. Each TO project contains promotion and offer economics, and eligibility information for a selected pool of prospects. Each TO project includes substitute offer groups 206, model calibration 204, and eligibility information that is combined with the prospect input to create an eligibility matrix 214.

For prospect input, one selects, randomly, a statistically significant sample or testing DCP (derived customer pool) 212 of a prospect list from a customer database 210. Matrices P and R are then calculated for selected prospects at 224. The next steps, to reduce the original linear multidimensional problem to a non-linear problem with a feasible number of dimensions and solve the non-linear problem for the selected sample numerically with the desired tolerance using a novel iterative algorithm (described below) is done by the optimization engine 240.

Input data reports 230 record the matrices and offers used. Using this input data, campaign level constraints 242, and offer level constraints 244, the optimization engine 240 produces a solicitation matrix 250. This is used to calculate report data 252 for optimization reports 254 that are tested at 260 to see if the selected constraints 242 and 244 satisfied the desired offer solicitation schema 256. If satisfied, a final report 260 is generated. If the offer solicitation schema 256 are not satisfied, campaign level constraints 242 and offer level constraints 244 are adjusted to produce another iteration.

Figure 3:
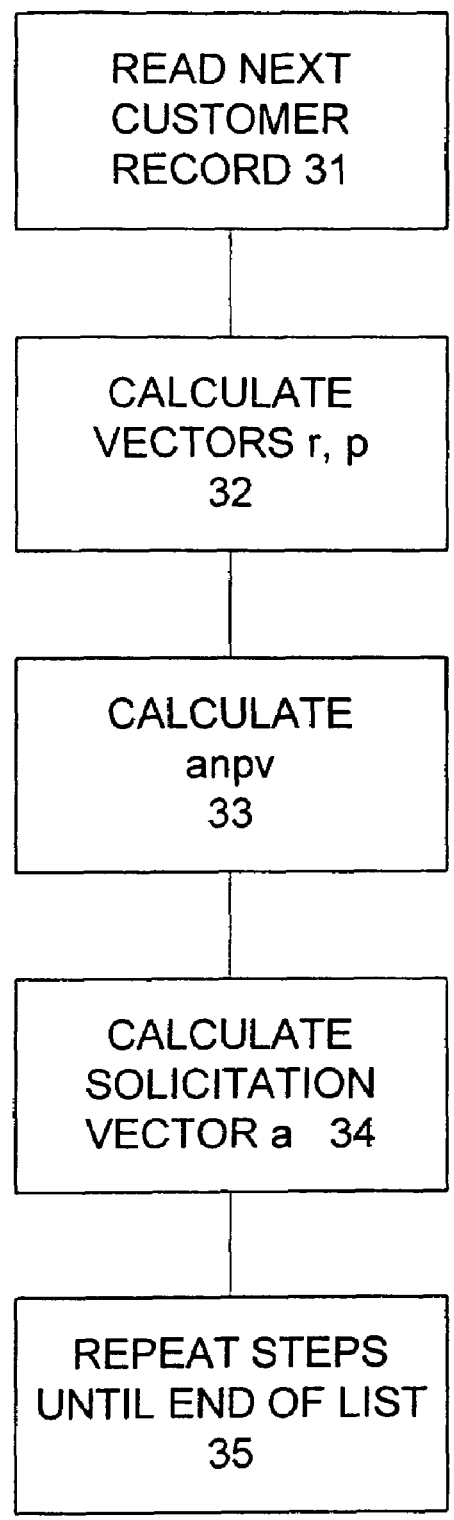
FIG. 3 is a flow chart of the single pass process of the present invention.

The optimization engine 240 calculates the vector of parameters L of the ANPV (adjusted NPV)functions $$ANPV_j(L, r_i, p_i),$$

where
 $j=1, 2, \ldots, \#$ of promotions;
 $r_i=(r_{ij})$-vector of propensities to respond of a customer i to promotions $1, 2, \ldots$
 $p_i(p_{ij})$-vector of profitability of a customer i for promotions $1, 2, \ldots$ It then calculates the optimal solicitation matrix 250 in a single pass through the full prospect list. To accomplish that, as shown in FIG. 3:

1. Read the next customer record 31;
2. Calculate vectors $r_i$ and $p_i$ 32;
3. Calculate $anpv_i=(ANPV_j(L, r_i, p_i), j=1, 2, \ldots, \#$ of promotions) 33;
4. Based on the values of $anpv_i$ and eligibility conditions, calculate solicitation vector
 $a_i=(a_{ij}, j=1, 2, \ldots, \ldots, \#$ of promotions ), which defines the optimal set of promotions that goes to a customer i at 34; and
5. Repeat the previous four steps until the end of the customer list at 35.

To calculate matrices P and R for selected prospects at 224 and reduce the original linear multidimensional problem to a non-linear problem with a feasible number of dimensions described above, the present invention needs to solve the high dimensional conditional extremum problem with a large number of restrictions. The present invention uses the Lagrange multiplier technique to take into account only the main restrictions. They can be of an equality or inequality type. This low-dimensional nonlinear problem is solved by a gradient type iterative process.

At each iterative step, the optimization of $ANPV_j(L, r_i, p_i)$ under customer-level restrictions (high dimensional linear problem) is made directly, record by record. It is equivalent to the following min-max problem:

$$Min_{j(Lb>0,Lc)} Max_{j(C<=0)} ANPV(L, r_i, p_i)$$

where $ANPV(L, r_i, p_i)=ANPV(L, r_i, p_i)_0 + L_b G_b(A, R, P) + L_c G_c(A, R, P)$ Here, summation over all the inequalities is assumed.

Figure 4:
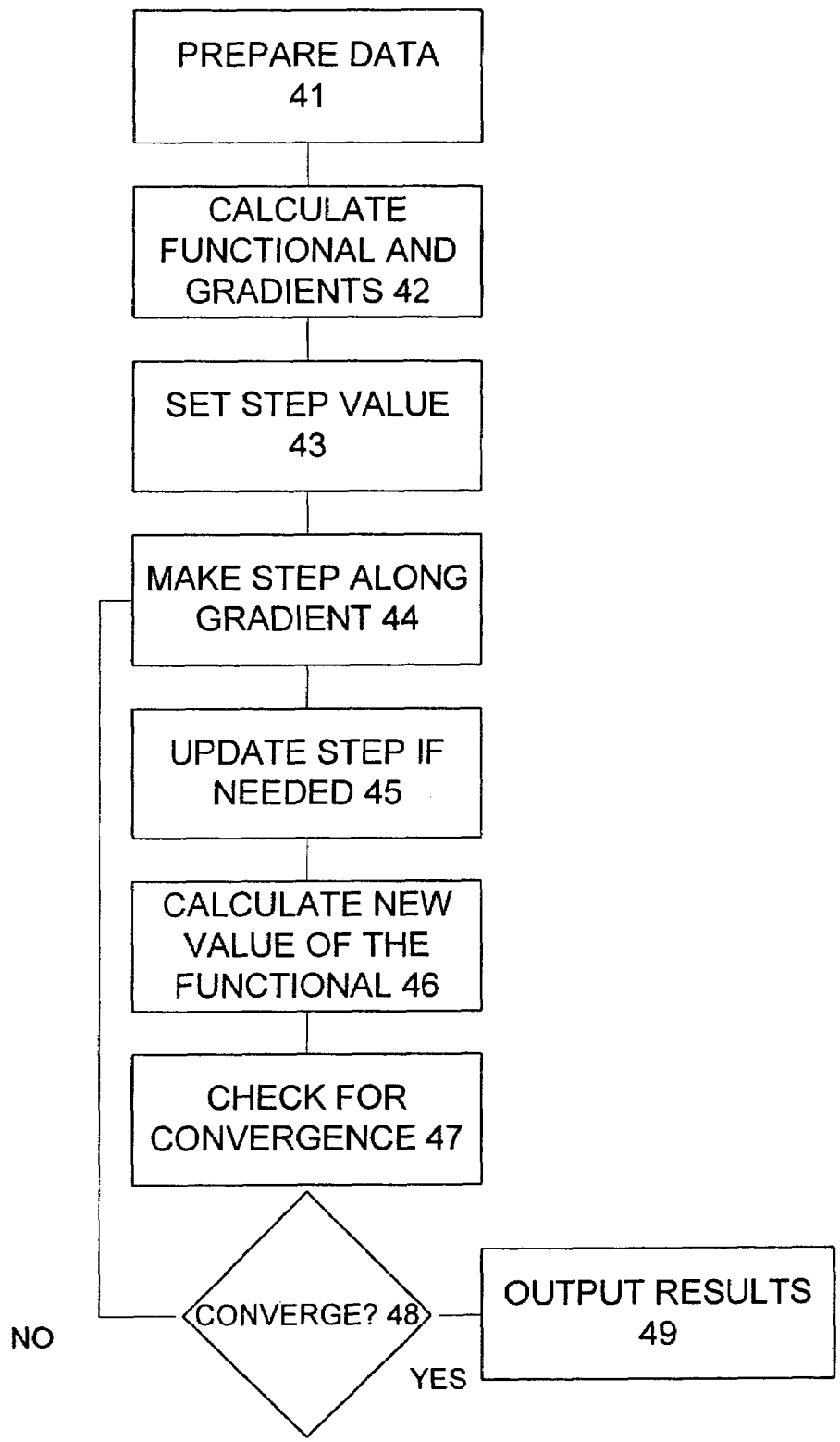
FIG. 4 is a flow chart of the novel iterative algorithm of the present invention.

The algorithm, as shown in FIG. 4, consists of following steps:
1. Prepare data 41.
2. Calculate initial value of the functional and gradients 42.
3. Set a value for initial algorithm steps 43; for each Lagrange multiplier, the step should be set equal to the initial value of the functional divided by the square of the gradient.
4. Make a step along the gradient 44.
5. Update the step 45, if needed.
6. Calculate new value of the functional 46, taking customer level restrictions into account.
7. Check convergence 47.
8. If not converged at 48, go to step 4.
9. Output the results 49 upon adequate convergence.

It is important to underscore that the above algorithm is not a heuristic, but delivers a strict mathematical solution for the multidimensional optimization problem formulated above.

Tests performed by inventors on a variety of real business cases show that the iterative procedure in Step 4 above typically converges with the tolerance of 0.1% in less then 30 iterations. That allows a user to work with the cross-selling optimizer of the present invention interactively and perform real-time analysis of the financial outcome of marketing activities.

A novel feature of the algorithm used by the present invention, the one-pass scoring, enables rollout scoring of a 100 M record database overnight.

The present invention operates on a computer system and is used for targeted marketing purposes. Using the present invention in conjunction with a neural network, the present invention provides a user with data indicating the individuals or classes or individuals who are most likely to respond to direct marketing.

We claim:

1. A computer-implemented method for optimizing a cross-selling marketing campaign, the method comprising:
    accessing a plurality of computer-readable instructions; and
    executing the instructions on a computer system comprising computer hardware including at least one computer processor, wherein execution of the instructions by the computer processor causes the computer system to perform a plurality of operations comprising:
        selecting from a plurality of customers a statistically significant sample of customers;
        calculating a plurality of response probabilities that each represent a probability that a specific customer will respond to a specific promotion;
        calculating a plurality of profitabilities that each represent a profitability resulting from a specific customer responding to a specific promotion;
        storing data that define a plurality of customer constraints in computer storage, wherein the customer constraints are selected from a group consisting of: an eligibility condition constraint, a peer group logic constraint, and a maximum number of offers constraint;
        storing data that define a plurality of economic constraints in computer storage, wherein each economic constraint is reflective of an economic goal of the cross-selling marketing campaign, thus formulating a linear optimization problem with a plurality of variables;
        reducing the linear optimization problem to a non-linear problem with a feasible number of dimensions, wherein the non-linear problem is mathematically equivalent to the linear optimization problem; and
        selecting a marketing campaign with desired expected utility and that satisfies the customer constraints and the economic constraints at least in part by iteratively solving the non-linear problem on the sample of customers within a pre-defined tolerance, wherein the non-linear problem takes into account at least some of the response probabilities and at least some of the profitabilities and the marketing campaign defines which customers receive which promotions.

2. The method of claim 1 wherein selecting a marketing campaign with desired expected utility comprises selecting a marketing campaign that is expected to have a higher net present value than another marketing campaign.

3. The method of claim 1 wherein selecting a marketing campaign with desired expected utility comprises selecting a utility function and using the utility function to calculate an expected utility of the marketing campaign.

4. The method of claim 1 wherein the customer constraints are expressed as linear functions.

5. The method of claim 4 wherein the economic constraints are expressed as linear functions.

6. The method of claim 1 wherein the customer constraints are expressed as at least one inequality.

7. The method of claim 6 wherein the economic constraints are expressed as at least one inequality.

8. The method of claim 1 wherein selecting a marketing campaign with desired expected utility further comprises generating a plurality of solicitation values that define which customers receive which promotions.

9. A campaign optimization system comprising: at least one data repository of computer storage containing at least one collection of data comprising:
    customer data related to a statistically significant sample of customers;
    response probability data representing a plurality of probabilities that a specific customer will respond to a specific promotion;
    profitability data representing, for each of a plurality of customers, profitability resulting from a specific customer responding to a specific promotion;
    customer constraint data representing a plurality of customer constraints, wherein the customer constraints are selected from a group consisting of: an eligibility condition constraint, a peer group logic constraint, and a maximum number of offers constraint: and economic constraint data representing a plurality of economic constraints, wherein each economic constraint is reflective of an economic goal of the cross-selling marketing campaign:
    computer hardware comprising at least one computer processor configured to execute software components that each comprise computer-executable instructions:
    a first software component configured, upon execution, to cause the computer processor to formulate a linear optimization problem with a plurality of variables:
    a second software component configured, upon execution, to cause the computer processor to reduce the linear optimization problem to a non-linear problem with a feasible number of dimensions, wherein the non-linear problem is mathematically equivalent to the linear optimization problem; and
    a third software component configured, upon execution, to cause the computer processor to select a marketing campaign with desired expected utility and that satisfies stored customer constraints and stored economic constraints at least in part by irerativly solving the non-linear problem on the sample of customers within a pre-defined tolerance, wherein the non-linear problem takes into account at least some of the stored response probabilities and stored profitabilities and the marketing campaign defines which customers receive which promotions.

10. The system of claim 9 wherein the at least one data repository comprises at least one database.

11. The system of claim 9 wherein the third software component is configured to select a marketing campaign with desired expected utility by selecting a marketing campaign that is expected to have the a net present value that is higher than another marketing campaign.

12. The system of claim 9 wherein the the second software component selects a marketing campaign with desired expected utility by selecting a utility function and using the utility function to calculate an expected utility of the marketing campaign.

13. The system of claim 9 wherein the customer constraints are expressed as linear functions.

14. The system of claim 12 wherein the economic constraints are expressed as linear functions.

15. The system of claim 9 wherein the customer constraints are expressed as at least one inequality.

16. The system of claim 15 wherein the economic constraints are expressed as at least one inequality.

17. The system of claim 9 wherein the second software module is further configured to generate and store in the at least one data repository a plurality of solicitation values that define which customers receive which promotions.

* * * * *